Patented Feb. 14, 1950

2,497,721

UNITED STATES PATENT OFFICE 2,497,721

CANNED LIQUID COFFEE AND METHOD OF MAKING SAME

John Harry Foulkes, Terre Haute, Ind., assignor to Finer Foods Packing Corp., Terre Haute, Ind., a corporation No Drawing. Application August 12, 1948, Serial No. 43,957

3 Claims. (Cl. 99—152)

This invention relates to canned coffee brew.

The chief object of the present invention is to produce a coffee brew that can be packaged and which will be as suitable from a flavor and aroma point of view as newly brewed coffee.

The chief feature of the present invention resides in treating the coffee brew while hot and then packaging the treated brew.

The invention accordingly is directed to a stabilized brew and the process of preparing same.

Other objects and features of the invention will be set forth more fully hereinafter.

Preferably the process is of the batch type and may be of the pressure vacuum type although the percolation method may be used and even the ordinary hot water method may be used. The latter is described.

The coffee to liquid ratio is approximately 240 ounces to the pound of pulverized coffee. This would make about forty six-ounce cups.

Hot water is supplied to the brew vessel in which is disposed a steam coil. When the water is in the neighborhood of 210 degrees Fahrenheit at sea level, the grounds are added and agitated. The brew is cooked for about three minutes and then drawn off.

This is effected through a strainer to separate the grounds. Then a filtering operation occurs, the filter medium being such that it removes the smallest particles from the brew but does not filter out the oils that have been freed from the grounds and are in suspension or emulsified.

To four hundred gallons of the fresh brew thus produced or similarly produced there is added while stirring approximately four hundred grains of soluble sodium phosphite, this being added as a solution and while the brew is still close to the boiling point. Then to same is added approximately four hundred teaspoons full of propylene glycol.

The resulting liquid while between 200 and 210 degrees Fahrenheit is bottled without foaming. Each bottle is filled to the top and then capped. The bottled brew when cooled to room temperature leaves a part of the neck unfilled. This shows the measure of vacuum sealing.

Alternative methods that may be employed are these: First, the brew before bottling may be flash pasteurized or, second, after capping the bottles may be subjected to higher temperatures such as running same up to 240 degrees Fahrenheit to insure sterility.

Coffee brew thus produced and packaged when opened and served cold as iced coffee or served hot is substantially the same in strength, taste and aroma as freshly brewed coffee having none of the staleness, bitterness, etc., of reheated old coffee. Also when cream is added thereto it will not turn a grey color.

All coffee contains certain metals among which natural or free iron is the most prominent. Tannic acid also is present as well as oxygen. The brew thus treated does not have therein ferric tannate one of the chief causes of bitterness, staleness and discoloration in coffee which has been brewed some time previously.

Obviously the brew water is as substantially free from iron as it is possible to obtain. Hence the location of the brewery will usually be determined by the water content.

When desired chickory may be included in the coffee grounds.

While the invention has been described in great detail in the foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A coffee brew capable of bottling and retaining its freshness, comprising a liquid coffee brew containing minor amounts of propylene glycol and soluble sodium phosphite.

2. A coffee brew as defined by claim 1 wherein each gallon of the fresh brew includes approximately one grain of soluble sodium phosphite and one teaspoon full of propylene glycol.

3. A method of making a packagable coffee brew comprising making a fresh brew of coffee with water almost at boiling and in contact with coffee grounds for about three minutes, then draining and filtering the brew from grounds, then adding minor amounts of soluble sodium phosphite and propylene glycol while the brew is near boiling, and then hermetically bottling same without foaming while near the boiling point.

JOHN HARRY FOULKES.

REFERENCES CITED

The following references are of record in the file of this patent:

UNITED STATES PATENTS

| Number | Name | Date |
|---|---|---|
| 1,525,272 | D'arrah | Feb. 3, 1925 |
| 1,956,290 | Heuser | Apr. 24, 1934 |
| 2,071,011 | Wendt | Feb. 16, 1937 |
| 2,204,896 | Kappenberg | June 18, 1940 |

OTHER REFERENCES

C. A., p. 5827, vol. 37.
C. A., p. 2864, vol. 40.
Fiene et al., "Handbook of Food Manufacture," p. 251, Chem. Pub. Co., N. Y., 1938.